(12) United States Patent
Riman et al.

(10) Patent No.: US 6,699,406 B2
(45) Date of Patent: Mar. 2, 2004

(54) RARE EARTH DOPED HOST MATERIALS

(75) Inventors: Richard E. Riman, Belle Mead, NJ (US); John Ballato, Central, SC (US)

(73) Assignee: Rutgers, The State University, New Brunswick, NJ (US)

( * ) Notice: Subject to any disclaimer, the term of this patent is extended or adjusted under 35 U.S.C. 154(b) by 0 days.

(21) Appl. No.: 09/272,912

(22) Filed: Mar. 19, 1999

(65) Prior Publication Data

US 2004/0000662 A1 Jan. 1, 2004

(51) Int. Cl.$^7$ .............................................. C09K 11/02
(52) U.S. Cl. ..................... 252/301.36; 252/301.4 H; 252/301.4 S; 252/301.4 R; 313/467; 313/483; 313/485; 313/502
(58) Field of Search ........................ 501/32; 313/467, 313/483, 502, 485; 423/263, 463, 464, 508, 518, 561.1, 566.2, 566.3, 573, 472; 252/301.4 H, 301.4 S, 301.4 R, 301.3 F, 301.3 G, 62.3 E, 62.3 R, 62.3 GP

(56) References Cited

U.S. PATENT DOCUMENTS

| | | | | |
|---|---|---|---|---|
| 3,233,189 A | * | 2/1966 | Guggenheim et al. | 252/301.4 H |
| 3,397,316 A | * | 8/1968 | Brown et al. | 252/301.4 H |
| 3,801,702 A | * | 4/1974 | Donohue | 423/263 |
| 3,836,784 A | * | 9/1974 | Bates et al. | 250/483 |
| 3,872,309 A | * | 3/1975 | De Belder et al. | 252/301.4 H |
| 4,099,089 A | * | 7/1978 | Rabatin | 252/301.4 H |
| 4,239,968 A | * | 12/1980 | Kotera et al. | 252/301.4 H |
| 4,916,360 A | * | 4/1990 | Mikami et al. | 252/301.6 S |
| 5,013,534 A | * | 5/1991 | Dissaux et al. | 423/263 |
| 5,076,963 A | * | 12/1991 | Kameyama et al. | 252/301.36 |
| 5,455,489 A | * | 10/1995 | Bhargava | 315/169.4 |
| 5,541,012 A | * | 7/1996 | Ohwaki et al. | 252/301.4 R |
| 5,637,258 A | * | 6/1997 | Goldburt et al. | 252/301.4 R |
| 5,698,397 A | * | 12/1997 | Zarling et al. | 435/6 |
| 5,811,924 A | * | 9/1998 | Okumura et al. | 313/487 |
| 5,891,361 A | * | 4/1999 | Kane | 252/301.4 H |
| 6,036,886 A | * | 3/2000 | Chhabra et al. | 252/301.4 R |
| 6,039,894 A | * | 3/2000 | Sanjurjo et al. | 252/301.4 H |
| 6,117,363 A | * | 9/2000 | Ihara et al. | 252/301.4 R |

OTHER PUBLICATIONS

Grant & Hackh's Chemical Dictionary, 5th ed., 1987, p. 126.*
Ballato et al., "Sol–gel synthesis of rare–earth–doped fluoride glass thin films," J. Mater, Res., 11(4), 841–9 (1996).
Ballato et al., "Fabrication of fibers with high rare–earth concentrations for Faraday isolator applications," Appl. Opt., 34(30), 6848–54 (1995).
Riman et al. "Sol–gel synthesis of fluoride gases and thin films," Eur. J. Solid State Inorg. Chem., 32(7/8, 873–82(1992).
Jones et al., "Crystal Growth of Fluorides in the Lanthanide Series," J. Crystal Growth, 2, 361–8 (1968).
Kudryavtseva et al., "Solubility of LnF3 in lanthanum fluoride," Sov. Phys. Crystallogr., 18(4), 531 (1974).
Ballato et al., "Sol–gel synthesis of rare–earth doped lanthanum halides for highly efficient 1.3 $\mu$m optical amplification," Opt. LEtt., 22(10), 691–693 (1997).

* cited by examiner

*Primary Examiner*—C. Melissa Koslow
(74) *Attorney, Agent, or Firm*—Synnestvedt & Lechner LLP

(57) ABSTRACT

A rare earth element doped composition having a dopant concentration of up to about 60 mole percent of one or more rare earth elements selected from Tb, Dy, Ho, Er, Tm, Yb and Lu, wherein the composition is optically transparent to wavelengths at which excitation, fluorescence or luminescence of the rare earth elements occur. Method for making the compositions, composite materials having dispersed therein the compositions and luminescent devices containing optical or acoustical elements formed from the composite materials are also disclosed.

27 Claims, 2 Drawing Sheets

RARE EARTH DOPED HOST MATERIALS

BACKGROUND OF THE INVENTION

The present invention relates to solid solution nanoparticles of host materials doped with one or more rare earth elements. The present invention additionally relates to solution methods for preparing from solution nanoparticles of rare earth element doped host materials. The present invention also relates to luminescent devices incorporating nanoparticles of rare earth element doped host materials.

Halide salts have received world-wide attention as materials for a myriad of photonic applications. This results from a chemistry in which the ionic species are of generally greater atomic mass and weaker bonding than oxide-based compounds. This intrinsically results in a greatly enhanced theoretical transparency-hence there is substantial interest from telecommunication companies looking for ultra-low loss halide (predominantly fluoride) optical fibers for long-haul communications. When halide materials are doped with luminescent ions (e.g., the rare-earths), the weak bonding between relatively heavy atoms further results in a reduced influence of the host on the dopant, thereby causing radiative emissions not available from the equivalent ion in, for example, oxide-based systems. Accordingly, the halides are said to be of low-phonon energy and thereby enabling of a wealth of applications. Pertinent examples are optical amplifiers at the 1.3 µm telecommunications window, upconversion light sources providing virtually any emission across the near-ultraviolet, visible, and near-infrared spectrum, color display materials (flat panel phosphors and volumetric monoliths), and long-wavelength sources for infrared imaging, atmospheric sensing, and military countermeasures. Collectively, these few applications represent a multi-trillion-dollar-per-year commerce.

Unfortunately, in most cases, conventional processing methods have failed in their efforts to produce optical components such as fibers with the promised near-intrinsic material properties much less expensively. Resultantly, rare-earth doped halide amplifiers are sold on a very small scale by a very small number of companies. Only applications utilizing relatively small-scale consumption of halide materials currently are sought-generally based on the halides' low-phonon energy nature and resultant luminescent properties.

In particular, conventional processing methods have failed to produce significant concentrations of rare earth element ions in metal halide salts. Jones et al. *J. Crystal Growth*, 2, 361–368 (1968) discloses that the concentrations of rare earth ions in $LaF_3$ crystals grown from a melt is limited to levels ranging from 25 mole percent for samarium (Sm) to less than 1 mole percent for ytterbium (Yb). Only cerium (Ce), praseodymium (Pr) and neodymium (Nd) are disclosed as being completely soluble in $LaF_3$.

Kudryavtseva et al., *Sov. Phys. Crystallogr.*, 18(4), 531 (1974) disclosed that higher solubilities can be obtained when melt-grown crystals are quenched into water. The disclosed improved solubilities in $LaF_3$ range from 65 mole percent for Sm down to 5 mole percent for lutetium (Lu).

Neither prior art publication discloses the direct preparation of rare earth element doped metal halide salt nanoparticles. A need exists for a method by which such particles may be directly prepared, as well as for materials having increased levels of rare earth element dopants from terbium (Tb) to Lu.

SUMMARY OF THE INVENTION

The present invention addresses these needs. It has now been discovered that solid solution rare earth element doped nanoparticles may be prepared by solution processing techniques, particularly in connection with either reactive atmosphere methods and solution synthesis methods at temperatures significantly below the melt temperatures of the materials.

The synthesis methods of the present invention may be employed to prepare nanoparticles doped with Tb, dysprosium (Dy), holmium (Ho), erbium (Er), thulium (Tm), Yb and Lu at levels heretofore unknown in the art. Therefore, according to another aspect of the present invention, a rare earth element doped composition is provided doped with up to about 60 mole percent of one or more rare earth elements selected from Tb, Dy, Ho, Er, Tm, Yb and Lu wherein the composition is optically transparent to wavelengths at which m excitation, fluorescence, or luminescence of the rare earth elements occur, and the level of rare earth element is greater than about 50 mole percent for Tb and Dy, greater than about 40 mole percent for Ho, greater than about 30 mole percent for Er, greater than about 20 mole percent for Tm, greater than about 10 mole percent for Yb and greater than about 5 mole percent for Lu. The composition may also be doped with a rare earth element other than Tb, Dy, Ho, Er, Tm, Yb and Lu in amounts providing a total rare earth element content of 90 mole percent or greater.

Preferred compositions include halides and chalcogenides of lanthanum (La), lead (Pb), and the Group II metals of the Periodic Chart, e.g. beryllium (Be), magnesium (Mg), Calcium (Ca), strontium (Sr) and barium (Ba). Semiconductor elements such as arsenic (As), and compounds of Group IIIA and IVA of the Periodic Chart may also be used, including, but not limited to silicon (Si), gallium arsenide (GaAs), gallium nitride (GaN), indium nitride (InN), and the like.

Thus, when a lanthanum halide is employed, compositions in accordance with the present invention will have the stoichiometric formula $M_yLa_{1-y}X_3$, wherein M is a rare earth element selected from Tb, Dy, Ho, Er, Tm, Yb and Lu; X is a halogen; and y is selected to provide a rare earth element dopant content within the above-described molar percent ranges for the rare earth element of M. The synthesis method of the present invention overcomes the stability problems encountered when synthesizing rare earth element doped halide salts of hygroscopic metals. This makes possible the preparation of rare earth element doped halide salts of these metals.

Two distinct methodologies may be employed to prepare the rare earth element doped metal halide salts of the present invention. In one method, the synthesis is performed by a reactive atmosphere treatment of multicomponent metal hydrous oxides, for example, by reaction with a halogenating gas. The present invention thus also provides a method of making nanoparticles by providing a substantially homogeneous multicomponent starting material containing a halide-forming metal and halide-forming rare earth element compound, and heating the starting material with an excess of a hydrogen halide or a halogenating gas in an atmosphere substantially free of water vapor at a temperature at which halogenation will occur, the temperature preferably being below the melt temperature of the lowest melting point component of the mixture.

The starting material may be a homogeneous physical mixture of compounds of the individual components (e.g., a mixture of nanosized particles) or a singular compound combining all of the components on an atomic scale of uniformity. Halide forming metal and rare earth element compounds include oxides, hydrous oxides and hydroxides.

According to another embodiment of this aspect of the invention, the rare earth element doped metal halide salts of the present invention may be prepared from an aqueous solution. Therefore, according to another aspect of the present invention, a method is provided for making nanoparticles of a metal halide salt doped with one or more rare earth elements by:

dissolving a water-soluble salt of a halide-forming metal in water with an excess of a water-soluble salt of the one or more rare earth element dopants, so that an aqueous solution of ions of the halide-forming metal and ions of the one or more rare earth element dopants is formed;

dissolving in the aqueous solution an excess of an ammonium halide; and precipitating from the aqueous solution nanoparticles of a metal halide salt doped with one or more rare earth elements.

In the present invention, the active ions entirely reside in individual low-phonon energy halide nanoparticles, thereby not being influenced by the ions of other particles. Incorporation of the nanoparticles of the present invention into a passive host matrix thus obviates the problems encountered with ion-ion energy transfer, cross-relaxation, upconversion, and the like, when each of the active species reside in their respectively doped particles.

Therefore, according to yet another aspect of the present invention, a composite is provided in which the nanoparticles of the present invention are dispersed as a guest in a polymer, glass or crystalline matrix that is chemically inert thereto and optically transparent to wavelengths at which excitation, fluorescence or luminescence of the rare earth element occurs. Matrix polymers suitable for use with the present invention include thermosetting and thermoplastic organic polymers free of intrinsic optical absorptions that would be a detriment to the rare earth element absorption, fluorescence or luminescence. For example, for infrared wavelengths, non-infrared absorbing polymers may be used, such as poly(vinylfluoride) and TEFLON AF (an amorphous poly(vinylfluoride)). TEFLON PFA (a perfluoroalkoxy copolymer) may also be used. Each nanoparticle dispersed in the polymer matrix may be doped with a different active species. The composites of the present invention are easily formed and readily fiberizable.

The highly doped materials of the present invention exhibit broader absorption and luminescence than observed from corresponding prior art materials doped in lower concentrations, thereby increasing the transfer and reception of infrared signals. This broadened emission band is advantageous for many luminescent devices, which also take advantage of the versatility of a reduced phonon energy environment. The emission band can be broadened further by employing a plurality of rare earth element compositions that upon excitation, fluorescence or luminescence emit a plurality of overlapping emission bands. The emission band can also be separated into distinct spectral lines through the use of a plurality of rare earth element compositions that upon excitation, fluorescence or luminescence emit a plurality of separate and distinct emission bands.

Therefore, according to still another aspect of the present invention, a luminescent device is provided incorporating the composite of the present invention. Examples of luminescent devices include zero-loss links, wavelength-division-multiplexing devices, upconversion light sources, standard light sources, and the like. Volumetric displays based on the composites of the present invention exhibit greatly enhanced performance, easier fabrication and reduced weight.

Composites of nanoparticles doped with different active species exhibit ultra-broad band emissions attributable to the additive effects of the individual dopants. This broadened emissions band is advantageous for the fabrication of sources operating in wavelength-division-multiplexing schemes.

The foregoing and other objects, features and advantages of the present invention are more readily apparent from the detailed description of the preferred embodiments set forth below, taken in conjunction with the accompanying drawings.

DETAILED DESCRIPTION OF THE PREFERRED EMBODIMENT

Figure 4:
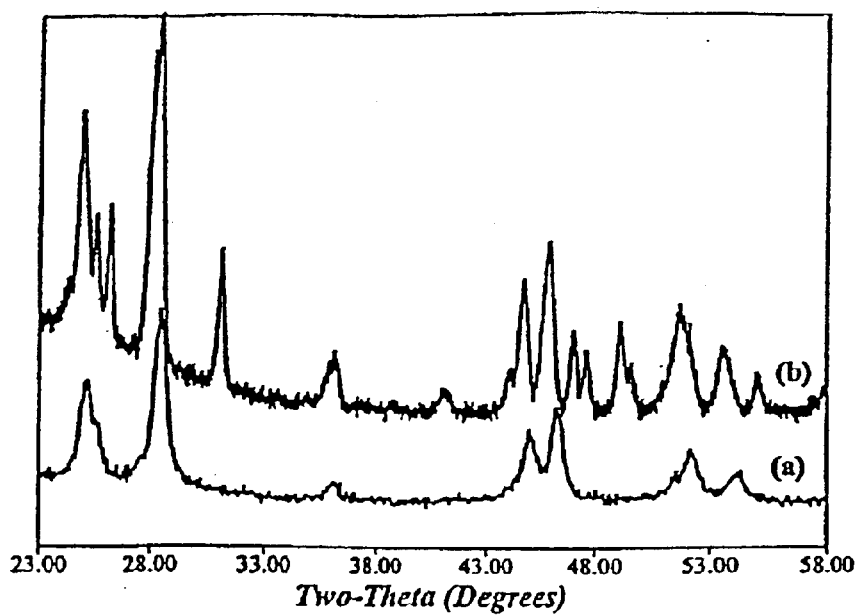
FIG. 4 depicts the fluorescence spectra for a 0.05 mole-percent Er-doped $LaF_3$ melt-grown single crystal and a $Er_{0.5}La_{0.5}F_3$ transparent gel.

Nanostructured rare earth element doped metal halide salts in accordance with one embodiment of the present invention are prepared by the reactive atmosphere treatment of halide-forming metal and rare earth element dopant compounds that form water-insoluble hydroxide precipitates. According to this process, water-soluble salts of the metals are dissolved in water at a temperature at which the salts will dissolve, and a molar equivalent of $NH_4OH$ is added to the water to precipitate the metal hydroxides.

For example, halide salts, preferably chloride salts, of metals such as Be, Mg, Ca, Sr, Ba and La, and preferably, Ca, Ba or La, are dissolved in water, preferably water that has been triply-deionized. That is, $BeCl_2$, $MgCl_2$, $CaCl_2$, $SrCl_2$, $BaCl_2$ or $LaCl_2 \cdot 6H_2O$ is dissolved in water at a temperature at which the salt will dissolve, typically room temperature up to about 90° C. For purposes of the present invention, room temperature is defined as 20° C.

Also added to the solution is a stoichiometric quantity of one or more water-soluble salts of the desired rare earth element at the desired level of doping. Rare earth element halide salts, preferably chloride salts, are used.

To obtain nanoparticles of a metal halide salt containing 10 mole percent rare earth (RE) element dopant, quantities of rare earth element halide salts and metal halide salts are added to the solution in amounts that provide 10 mole percent of rare earth element ions relative to the total metal ion content of the solution. Suitable water-soluble rare earth element salts include chloride salts such as $RECl_3 \cdot 6H_2O$, wherein RE is a rare earth element.

The rare earth element ions and the ions of the metal halide are precipitated from solution as insoluble multicomponent oxides, hydrous oxides and hydroxides by the addition of a stoichiometric excess of $NH_4OH$. The precipitate should be washed with water, preferably triply-deionized, to remove the ammonium halide reaction by-product. Preferably, the precipitate is washed several times, and then dried, preferably by heating, for example, at 90° C. for 24 hours. Alternatively, the ammonium halide can be removed by sublimation.

The dried precipitate is then subjected to reactive atmospheric processing. The precipitate is placed in an oven, for example a muffle-tube furnace, which is purged with inert gas, such as nitrogen gas, and then heated at a rate between about 1 and about 50 C.°/minute, and preferably 10 C.°/minute, to a temperature at which halogenation of the hydroxides will occur without melting the lowest melting point component of the mixture. Preferably, the hydroxides are heated to a temperature between about 100 and about 600° C., and more preferably to a temperature between about 200 and about 300° C.

The hydrogen halide corresponding to the halide salt to be formed is then introduced into the nitrogen flow to form a gas mixture. Thus, to form a metal fluoride salt doped with one or more rare earth elements, hydrogen fluoride is introduced into the nitrogen flow, and to form a metal chloride salt doped with one or more rare earth elements, hydrogen chloride is introduced into the nitrogen flow. The hydrogen is preferably anhydrous. Other halogenation gases may be used as well, including aprotic gases such as $SF_6$ or NF3. $H_2S$ may be used to form metal sulfides.

The precipitate quantitatively converts to the respective halide. Depending upon the temperature at which the oven is heated, the conversion takes place within about one-half to about two hours, after which the introduction of the hydrogen halide to the nitrogen flow is discontinued and the oven is cooled to room temperature under the flowing nitrogen atmosphere.

In accordance with another embodiment of the present invention, the nanoparticles of metal halide salts doped with one or more rare earth elements are prepared by a solution synthesis from an aqueous solution. An aqueous solution of rare earth element ions and halide-forming metal ions are prepared as in the reactive atmosphere method. A stoichiometric excess of the rare earth element may be employed. Excess ammonium halide is then added to the solution, which is selected to provide the desired halide anions for the resulting rare earth element doped metal halide salt.

The solution is then stirred at a temperature at which all of the salts of the ammonium halide are soluble in water at the quantities employed, typically between about room temperature and about 90° C. Stirring continues until the halogenation of the rare earth element ions and host metal ions is essentially complete, typically between about fifteen minutes and about five hours. The reaction time decreases with increasing temperature.

The particles are then precipitated from the solution in the form of nanosized particles. When the halide is a fluoride, precipitation is not necessary, because the fluorides are water-insoluble. For chlorides and higher halides, precipitation is obtained by adding a polar organic solvent such as ethanol, to the solution in an quantity effective to precipitate the doped metal salt.

The precipitate is washed with water by the same technique employed to purify the precipitates of the reactive atmosphere treatment. However, the precipitated particles are then centrifuged to ensure complete removal of $NH_4OH$ or any other ammonium by-product.

The metal halide salts doped with one or more rare earth elements are obtained as nanoparticles having a crystallite size between about 1 and about 100 nm, preferably between about 10 and about 50 nm, and more preferably between about 15 and about 25 nm. The halides can contain oxygen and still exhibit luminescent properties characteristic of high-quality optical materials. The doped metal is preferably La or a metal of Group II, i.e. Be, Mg, Ca, Sr, Ba, La, Ca and Ba are preferred.

Independent of particle size, rare earth element doped lanthanum halides are known, however, the rare earth element doped Group II metals and semiconductor elements and compounds of Group III A and Group IV A of the Periodic Chart are novel and non-obvious compounds. Chalcogenides of La and Group II metals doped with rare earth elements are also novel and non-obvious. Such compounds in accordance with the present invention typically contain between about 1 and about 99 mole percent rare earth element dopant.

The rare earth element doped chalcogenides and oxyhalides of La and Group II metals are prepared by well-known methods. The methods for preparing rare earth element doped semiconductor elements and compounds are also well-known.

Certain of the rare earth element doped lanthanum halide salts of the present invention are novel and non-obvious independent of particle size. The novel and non-obvious salts have the dopant levels of rare earth elements heretofore unknown in the art. Such halide salts have the stoichiometric formula $M_yLa_{1-y}X_3$, wherein M is a rare earth element selected from Tb, Dy, Ho, Er, Tm, Yb and Lu; X is a halogen; and $z<y<0.60$, wherein z is 0.50 for Tb and Dy, 0.40 for Ho, 0.30 for Er, 0.20 for Tm, 0.10 for Yb and 0.05 for Lu. Fluorine and chlorine are the preferred halogens.

Composite materials in which the nanosized particles of the present invention are dispersed in a matrix chemically inert thereto may be prepared by essentially conventional techniques. Alternatively, the nanosized particles may be precipitated into the matrix material. The matrix materials include glass, crystalline materials and polymeric materials. The matrix material should have excellent optical transparency at wavelengths at which excitation, fluorescence or luminescence of the rare earth element occurs, and good film-forming characteristics. For purposes of the present invention, "optically transparent" materials are defined as having very low light attenuation from reflectance, scattering and absorption phenomena. Other properties will come into consideration, depending upon the particular end-use requirements of the materials; however, these properties are well understood by those of ordinary skill in the art.

Typically, host polymers for infrared wavelengths are fluoropolymers such as poly(vinylfluoride), poly (vinylidenefluoride), TEFLON AF, and TEFLON PFA. The dispersion of the nanosized particles into the matrix to form the composite should be performed at a temperature below which the phase separation of the rare earth element dopant and the host material will occur, which is readily apparent to one of ordinary skill in the art.

Luminescent devices assembled from the composite materials of the present invention are also novel and non-obvious, and meet the need for articles with luminescent properties that are nanostructured so as not to interfere with the optical properties of the devices in which they are employed. Composite materials can be employed to produce a variety of useful articles with valuable optical properties. The composites can be readily processed by conventional techniques to yield optical fibers, bulk optics, films, monoliths, and the like. Optical applications thus include the use of the composite materials to form the elements of zero-loss links, upconversion light sources, standard light sources, volumetric displays, flat-panel displays, sources operating in wavelength-division-multiplexing schemes and the like.

The following non-limiting examples set forth hereinbelow illustrate certain aspects of the invention. All parts and percentages are molar unless otherwise noted and all temperatures are in degrees Celcius.

EXAMPLES

Example 1

Reactive Atmosphere Preparation of Pr and Dy Doped $LaF_3$ and $LaCl_3$ $LaCl_3$ solutions were prepared by dissolving $LaCl_3 \cdot 6H_2O$ (Johnson Matthey Electronics, Ward Hill, Mass.) in triply-deionized water (TDW). Doped samples were synthezied by the addition of 60 mole percent $PrCl_3 \cdot 6H_2O$ or 60 mole percent $DyCl_3 \cdot 6H_2O$ to the aqueous $LaCl_3$ solutions. Excess $NH_4OH$ was added to precipitate $La(OH)_3$ and $Pr(OH)_3$ or $Dy(OH)_3$ out of each solution. The samples subsequently were washed five times in TDW to remove the ammonium chloride reaction by-product, and dried at 90° C. for 24 hours.

The samples were then transferred to an alumina muffle-tube furnace (CM Furnace Company, Bloomfield, N.J.) for reactive atmosphere processing. The sealed furnace was purged with nitrogen gas, taken off a liquid source, and heated to 200° C. at 10 C.°/minute. Anhydrous hydrogen fluoride or hydrogen chloride (both 99.9% pure, Matheson Gas Products, East Rutherford, N.J.), then was introduced into the nitrogen flow providing conversion of the lanthanum hydroxide to the respective lanthanum halide (about 500 cm³/min. HF or HCl, about 500 cm³/min. $N_2$). Reactive atmosphere processing lasted one hour, at which point the reactive gas was turned off and the furnace cooled to room temperature under the flowing nitrogen atmosphere, followed by recovery of the Pr and Dy doped La fluorides and chlorides.

Example 2

Solution Synthesis Preparation of Pr, Er and Dy Doped $LaF_3$

Aqueous $LaCl_3$ solutions were prepared as in Example 1 by dissolving $LaCl_3 \cdot 6H_2O$ in TDW. Doped samples were prepared by dissolution of the respective Pr, Er and Dy chloride salts in the $LaCl_3$ solutions. The doped levels were varied over the 0–100 percent mole range, in 10 mole percent increments. Excess $NH_4F$ was added to the solutions, which were stirred for one hour at 90° C. The samples subsequently were washed three times in TDW, following centrifugal casting (Beckman, Model J2-21M, Palo Alto, Calif.) at 2000 rpm, corresponding to 440 times the force of gravity, for five minutes. This was sufficient to remove the $NH_4OH$ or the $NH_4Cl$ reaction by-product, as determined by X-ray diffraction, after which the Pr, Er and Dy doped $LaF_3$ samples were recovered.

Measured lattice parameters as a function of mole percent may be calculated using Bragg's law at the X-ray reflection maximum for $Er_yLa_{1-y}F_3$. Theoretical values were calculated from Joint Committee Power Diffraction Standards (JCPDS) using Vergard's law which states that the lattice cell dimensions of a host vary linearly with the concentration of an added solute.

Figure 1:
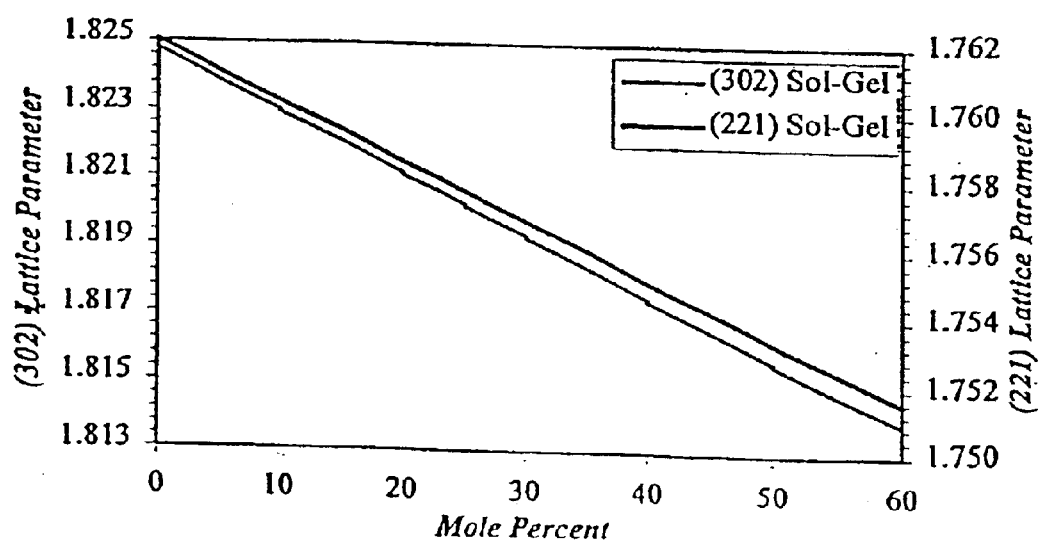
FIG. 1 depicts the relationship between the experimentally determined lattice parameters and mole percentage dopant for the (302) and (221) X-ray reflections from solution-derived $Er_yLa_{1-y}F_3$.

The solid solubility range for the solution-derived $Er_yLa_{1-y}F_3$ is shown in FIG. 1. Linearity of the $LaF_3$ X-ray diffraction (302) and (221) peak shifts with mole percent erbium and indicates that the solubility extends to 60 mole percent $ErF_3$. This represents an increase of approximately 55 mole percent over the intrinsic solubility limit determined by Jones et al., based on X-ray diffraction analysis of rare earth doped $LaF_3$ crystals grown from the melt. Enhancements to this intrinsic limit of 30–40 mole percent $ErF_3$ were made by Kudryavtseva et al., by quenching single crystals from the melt into water.

TABLE 1

COMPARISON OF SOLID SOLUTION LIMITS FOR $(Pr, La)F_3$, $(Dy, La)F_3$ AND $(Er, La)F_3$ BETWEEN SOLUTION-SYNTHESIZED AND MELT-DERIVED SYSTEMS

| SOLUTION | SYNTHESIS METHODOLOGY | SOLUBILITY RANGE (MOLE %) | ENHANCEMENT TO SOLUBILITY LIMIT (MOLE %) |
|---|---|---|---|
| $(Pr, La)F_3$ | Jones | 0–100 | — |
|  | Sol-Gel | 0–100 | 0 |
| $(Dy, La)F_3$ | Jones | 0–5 | — |
|  | Kudryavtseva | 0–40 | 35 |
|  | Sol-Gel | 0–60 | 55 |
| $(Er, La)F_3$ | Jones | 0–1 | — |
|  | Kudryavtseva | 0–30 | 29 |
|  | Sol-Gel | 0–60 | 59 |

Figure 2:
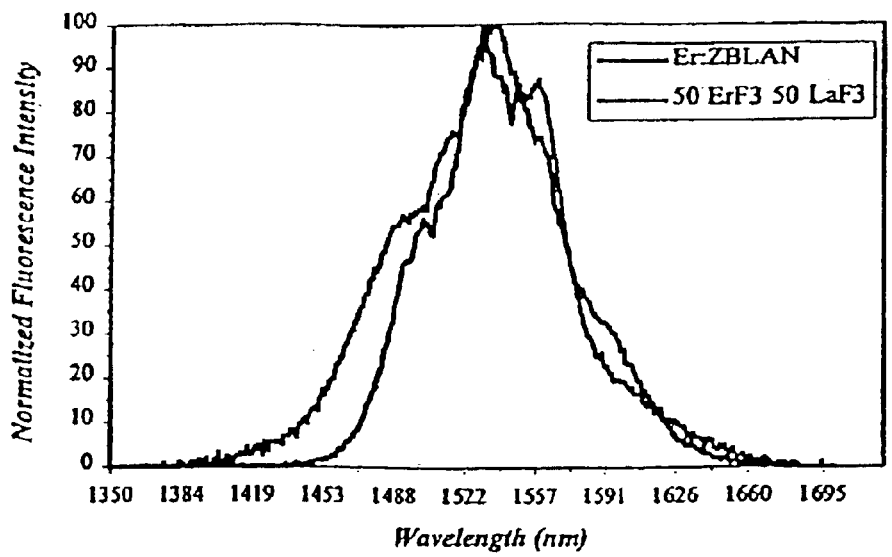
FIG. 2 depicts X-ray diffraction scans of solution-derived $Er_{0.5}La_{0.5}F_3$ following solution fluorination at 90° C. for one hour and heat treatment at 1200° C. for one hour.
Figure 3:
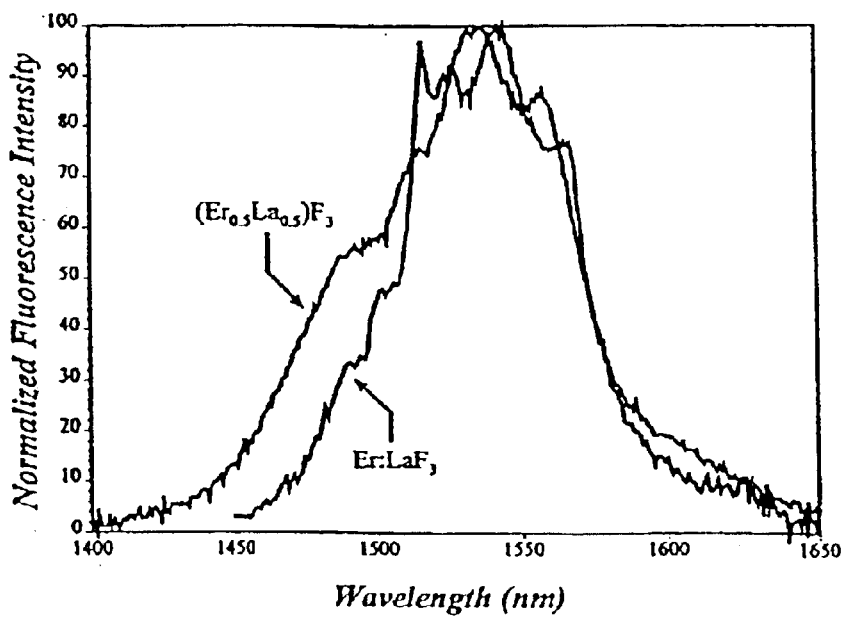
FIG. 3 depicts the luminescence from the $^4I_{13/2} \rightarrow {}^4I_{15/2}$ transition of solution-derived $Er_{0.5}La_{0.5}F_3$ and Er:ZBLAN glass.

Table 1 compares the solid solubility limits for $Pr_yLa_{1-y}F_3$, and $Dy_yLa_{1-y}F_3$ crystals prepared by melt-grown and solution-fluorination methods. The novel compositional flexibility exhibited in the $Er_yLa_{1-y}F_3$ (0<x<60 mole percent) system is presumed to arise from a processing-induced crystallographic metastability. In order to test this hypothesis, the 90° C. solution-derived $Er_{0.5}La_{0.5}F_3$ sample was heated to 1200° C. for one hour. This temperature was chosen since it is intermediate between the melting points of the $ErF_3$ (Tm=1146° C.) and $LaF_3$ (Tm=1493° C.) end-members, and should provide ample energy to overcome any kinetic hindrances. The results of this study are shown in FIG. 2. Curve (a) is indicative of a doped $LaF_3$ crystal whereas curve (b) displays the characteristic reflections of both $ErF_3$ and $LaF_3$; i.e., the sample has phase-separated. Novel enhancements to the solid solubility range of rare-earths in lanthanum fluoride thus result from the solution fluorination technique of the present invention.

Luminescence at 1.55 μm from the Er:ZBLAN glass and $Er_{0.5}La_{0.5}F_3$ solution-derived gel was found to be 19% broader than Er:ZBLAN glass. This result is of particular interest given that for single amplifier operation of optical fiber amplifiers, fluorides exhibit better gain flatness than silica and for cascaded multiple optical amplifier operation, this characteristic is dramatically enhanced.

To compare the solution-fluorinated, highly-erbium-doped $LaF_3$, fluorescence measurements were performed on a 0.05 mole percent $Er:LaF_3$ crystals grown from the salt The results of this study are shown in FIG. 4. The 3 dB spectral width of the highly doped, solution fluorinated sample is 24 nm broader than the low-concentration analog. FIG. 4 shows the fluorescence from the solution-derived, polycrystalline $Er_{0.5}La_{0.5}F_3$ and a melt-grown $Er:LaF_3$ single crystal. $LaF_3$ has been noted as an "exceptionally suitable" host for $Er^{3-}$ since it permits high concentrations, long lifetimes for excited states (i.e., low-phonon energy), and strong Stark splitting. This provides a spectral shape appropriate for broad-band amplification with a usable optical bandwidth exceeding 800 GHz. The spectra corresponding to the solution-derived $Er_{0.5}La_{0.5}F_3$ exhibited an even broader luminescence with a 3 dB width of 88 nm in comparison to the 64 nm for $Er:LaF_3$. This Δλ for $Er_{0.5}La_{0.5}F_3$ implies an optical bandwidth of 11,000 GHz, which is a 37.5% increase in available optical bandwidth, with respect to $Er:LaF_3$, based on luminescence spectra.

The present invention thus provides highly-doped metal halide salts having quantum efficiencies ordinarily obtained from bulk single crystals. Dispersion of the particles in an appropriate matrix will produce a bulk material having levels of quantum efficiency heretofore not achieved. This results in increased emission intensity, which allows for greater distances to be employed between amplifiers. The increased emission intensity also permits the denser packing of information in light-readable formats, an increase in laser power output, improvements in display color quality and control of individual spectral line intensity as a function of wavelength (gain leveling).

Because of the broadened emission bandwidths of the particles of the present invention, dispersions in an appropriate matrix will also produce a bulk material with bandwidth breadth heretofore not achieved. This increases the number of signals that can be transmitted by wavelength-division-multiplexing. These properties are advantageous for many optical end-use applications.

The foregoing examples and description of the preferred embodiment should be taken as illustrating, rather than as limiting, the present invention as defined by the claims. As would be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A composite material comprising a dispersion in a polymeric matrix of a rare earth element composition comprising nanosized particles of a rare earth element doped host metal halide salt, wherein up to about 60 mole percent of said host metal is replaced with one or more rare earth elements selected from the group consisting of Tb, Dy, Ho, Er, Tm, Yb and Lu, said composite material being optically transparent to wavelengths at which excitation and fluorescence or luminescence of said rare earth elements occur, and wherein said nanosized particles consist essentially of particles having a crystallite size between about 1 and less than 100 nm.

2. The composite material of claim 1, wherein said host metal of said halide salt is selected from the group consisting of La, Be, Mg, Ca, Sr, Pb and Ba.

3. The composite material of claim 2, comprising a rare earth element fluoride or chloride salt.

4. The composite material of claim 1, further comprising one or more rare earth elements other than Tb, Dy, Ho, Er, Tm, Yb and Lu.

5. The composite material of claim 1, wherein said host metal of said metal halide salt is selected from the group consisting of La, Be, Mg, Ca, Sr and Pb.

6. A composite material comprising a dispersion in a polymeric matrix of a rare earth element composition comprising nanosized particles of a rare earth element doped host metal oxyhalide salt, wherein:
   said host metal is selected from the group consisting of La, Be, Mg, Ca, Sr, Pb and Ba;
   up to about 60 mole percent of said host metal is replaced with one or more rare earth elements selected from the group consisting of Tb, Dy, Ho, Er, Tm, Yb and Lu;
   said composite materials is optically transparent to wavelengths at which excitation, fluorescence or luminescence of said rare earth elements occur; and
   said oxyhalide particles consists essentially of particles having a crystallite size between about 1 and about 100 nm.

7. The composite material of claim 1 or claim 6, wherein said matrix is a fluoropolymer.

8. A luminescent device comprising an optical element form-ed from the composite material of claim 1 or claim 6.

9. The luminescent device of claim 8, wherein said device is a zero-loss link, upconversion light source, standard light source, volumetric display, flat panel display, or a source operating in a wavelength-division-multiplexing scheme.

10. A luminescent device comprising an optical element form-ed from the composite material of claim 6, said composite material comprising a plurality of rare earth element compositions that upon excitation, fluorescence or luminescence emit a plurality of overlapping emission bands.

11. A luminescent device comprising an optical element form-ed from the composite material of claim 6, said composite material comprising a plurality of rare earth element compositions that upon excitation, fluorescence or luminescence emit a plurality of separate and distinct emission bands.

12. The luminescent device of claim 11, wherein said device is a volumetric display or a flat panel display.

13. A composite material comprising a dispersion in a polymeric matrix of a rare earth element composition comprising nanosized particles of a rare earth element doped host metal chalcogenide salt, wherein:
   said host metal is selected from the group consisting of La, Be, Mg, Pb and Ba;
   up to 60 mole percent of said host metal is replaced with one or more rare earth elements selected from the group consisting of Tb, Dy, Ho, Er, Tm, Yb and Lu;
   said composite material is optically transparent to infrared wavelengths and wavelengths at which fluorescence or luminescence of said rare earth elements occur; and
   said chalcogenide particles consist essentially of particles having a crystallite size between about 1 and 100 nm.

14. The composite material of claim 13, wherein said matrix polymer is a fluoropolymer.

15. A luminescent device comprising an optical element formed from the composite material of claim 13.

16. The luminescent device of claim 15, wherein said device is a zero-loss link upconversion light source, standard light source, volumetric display, flat panel display, or a source operating in a wavelength-division-multiplexing scheme.

17. The luminescent device of claim 15, comprising a plurality of rare earth element compositions that upon excitation, fluorescence or luminescence emit a plurality of overlapping emission bands.

18. The luminescent device of claim 15, comprising a plurality of rare earth element compositions that upon excitation, fluorescence or luminescence emit a plurality of separate and distinct emission bands.

19. The luminescent device of claim 18, wherein said device is a volumetric display or a flat panel display.

20. The composite material of claim 6 or claim 13, further comprising one or more rare earth elements other than Tb, Dy, Ho, Er, Tm, Yb or Lu.

21. A method for making nanosized particles of a rare earth element doped metal halide salt doped with up to about 60 mole percent of one or more rare earth elements, consisting of essentially of:
   providing a substantially homogenous stoichiometric mixture of a starting material comprising a halide-forming metal salt and one or more rare earth elements; and heating said mixture with an excess of hydrogen halide or halogenating gas in an atmosphere substantially free of water vapor at a temperature at which halogenation will occur between about 1000 and about 600° C., the temperature being below the melt temperature of the lowest melting point component of the mixture.

22. The method of claim 21, wherein said halid-forming metal is selected from the group consisting of La, Be, Mg, Ca, Sr, Pb and Ba.

23. The method of claim 21, wherein said hydrogen halide is HF or HCl.

24. A method for making nanoparticles of a rare earth element doped metal halide salt doped with one or more rare earth elements, comprising;

dissolving a water-soluble salt of Be, Mg, Ca, Sr or Ba in water with up to about 60 mole percent of a water-soluble salt of one or more rare earth elements, so that an aqueous solution of ions of Be, Mg, Ca, Sr or Ba and ions of the one or more rare earth elements is formed;

dissolving in said aqueous solution an excess of an ammonium halide; and precipitating from said aqueous solution nanoparticles of a halide of Be, Mg, Ca, Sr or Ba doped with from about 1 to about 60 mole percent of one or more rare earth elements.

25. The method of claim 24, wherein said step of dissolving an excess of anmonium halide in said aqueous solution comprises the step of stirring said ammonium halide in an aqueous solution at a temperature between about room temperature and about 90° C.

26. A method for making nanoparticles of rare earth element doped metal chlorides and higher halides doped with one or more rare earth elements, comprising:

dissolving a water-soluble salt of a halide-forming metal in water with up to about 60 mole percent of a water-soluble salt of one or more rare earth elements, so that an aqueous solution of ions of the halide-forming metal and ions of the one or more rare earth elements is formed;

dissolving in said aqueous solution an excess of ammonium chloride or higher halide; and adding to said aqueous solution an amount of polar solvent effective to precipitate nanoparticles of a metal chloride or higher halide doped with from about 1 to about 60 mole percent of one or more rare earth elements.

27. The method of claim 26, wherein said polar solvent comprises ethanol.

\* \* \* \* \*

UNITED STATES PATENT AND TRADEMARK OFFICE
CERTIFICATE OF CORRECTION

| | |
|---|---|
| PATENT NO. | : 6,699,406 B2 |
| APPLICATION NO. | : 09/272912 |
| DATED | : March 2, 2004 |
| INVENTOR(S) | : Richard E. Riman et al. |

It is certified that error appears in the above-identified patent and that said Letters Patent is hereby corrected as shown below:

Claim 21, Column 11, Line 4, "1000" should read --100--.

Claim 22, Column 11, Line 7, "halid-forming" should read --halide-forming--.

Signed and Sealed this

Fourth Day of September, 2007

JON W. DUDAS
*Director of the United States Patent and Trademark Office*